US009490618B2

(12) United States Patent
Garvin (10) Patent No.: US 9,490,618 B2
(45) Date of Patent: Nov. 8, 2016

(54) ELECTRICAL SPLICE BOX (71) Applicant: Barton L. Garvin, Western Springs, IL (US)

(72) Inventor: Barton L. Garvin, Western Springs, IL (US)

(*) Notice: Subject to any disclaimer, the term of this patent is extended or adjusted under 35 U.S.C. 154(b) by 34 days.

(21) Appl. No.: 14/512,351

(22) Filed: Oct. 10, 2014

(65) Prior Publication Data

US 2016/0105007 A1  Apr. 14, 2016

(51) Int. Cl.
| | |
|---|---|
| *H02G 1/14* | (2006.01) |
| *H02G 3/14* | (2006.01) |
| *H02G 3/06* | (2006.01) |
| *H02G 3/08* | (2006.01) |
| *H02G 3/10* | (2006.01) |
| *H02G 3/12* | (2006.01) |

(52) U.S. Cl.
CPC .............. *H02G 3/086* (2013.01); *H02G 3/085* (2013.01); *H02G 3/10* (2013.01); *H02G 3/126* (2013.01)

(58) Field of Classification Search
CPC ...... H02G 3/08; H02G 3/085; H02G 3/0666; H02G 1/14
USPC .......................................... 174/50, 50.6, 663
See application file for complete search history.

(56) References Cited

U.S. PATENT DOCUMENTS

| | | | | |
|---|---|---|---|---|
| 5,962,811 A | * | 10/1999 | Rodrigues .............. | H02G 15/10 174/76 |
| 6,930,246 B1 | * | 8/2005 | Blundo .................. | H02G 3/083 174/135 |
| 2005/0092506 A1 | * | 5/2005 | Hull ....................... | H02G 3/085 174/50 |
| 2009/0056969 A1 | * | 3/2009 | Herth ..................... | H02G 3/121 174/58 |
| 2010/0243315 A1 | * | 9/2010 | Shumate ................ | H02G 3/085 174/666 |
| 2014/0000925 A1 | * | 1/2014 | O'Connor .............. | H02G 3/123 174/50 |
| 2014/0000956 A1 | * | 1/2014 | Wurms ................... | H02G 3/08 174/535 |

OTHER PUBLICATIONS

Garvin, "4" Open Splice Octagon Box, 2-⅛" Deep with 8 Side Slots and 4 Nonmetallic Cable Connectors" http://www.garvinindustries.com/electrical-junction-boxes/3-1-2-and-4-octagon-junction-boxes/4-octagon-open-splice-kit/54171-opr. pp. 1-2 (Jan. 2014).

* cited by examiner

*Primary Examiner* — Hoa C Nguyen
*Assistant Examiner* — Amol Patel
(74) *Attorney, Agent, or Firm* — David G. Rosenbaum; Benjamin D. Rotman; Rosenbaum IP, P.C.

(57) ABSTRACT

An electrical splice box comprising an enclosure formed by a plurality of sidewalls surrounding a baseplate and extending substantially perpendicularly from the baseplate. The enclosure has an open side opposite the baseplate and is configured to enclose electrical splices. A cover may be removably attached to the open side of the enclosure. A plurality of slots are formed in at least some of the sidewalls, where at least some of the sidewalls have at least one slot. A plurality of cable locks are removably attached to the baseplate. Each cable lock is positioned at a corresponding slot to receive and to hold a cable inserted into the slot.

19 Claims, 6 Drawing Sheets

ELECTRICAL SPLICE BOX

BACKGROUND

Electrical power is distributed to different parts of a building using electrical wires that are typically enclosed in a plastic or a metallic covering. The electrical wiring in a building is installed within walls to extend from the power source in the building to the various electrical components throughout the building such as switches, lights, and other components. Electrical wires may be spliced to extend or re-direct one length of wire to another length of wire. Splices in a building are commonly used when the building is modified by, for example the addition of a room, or when changes are made to the electrical distribution in the building.

Splices typically involve joining the bare ends of the conductors of two wires by twisting and/or soldering the ends to form a connection. A non-metallic cable connector or wiring nut is often used to cover the connection. Splices may effectively be used to extend or re-direct electrical wiring. However, such splices are typically left open without any other covering within walls surrounded by building material such as insulation and studs or other supporting structure.

Such open splices present a common and dangerous problem in the electrical industry. When work is being performed in the vicinity of such splices, the wires may get pulled enough to expose the conductors in the splice. Such open splices can also start a fire under the right circumstances. On the other hand, the splices when correctly made provide a cost effective alternative to replacing the wiring.

Despite violating electrical industry codes, open splices are common particularly in older buildings. One way of making the wiring safer is to replace the spliced wiring with new wiring. Replacing the wiring however would be costly. There is a need in the art for a way of making electrical wiring that includes open splices safe.

SUMMARY OF THE INVENTION

In view of the above, an electrical splice box is provided for enclosing otherwise open splices. An example of an electrical splice box comprises a plurality of sidewalls surrounding a baseplate. The sidewalls extend substantially perpendicularly from the baseplate to form an enclosure with an open side opposite the baseplate. The enclosure is configured to enclose at least one splice formed with wires from at least two cables. A plurality of slots is formed in the sidewalls, where at least some of the sidewalls have at least one slot. A plurality of cable locks are removably fastened to the baseplate. Each cable lock is positioned at a corresponding slot to receive and to hold a cable inserted into the slot.

In another example implementation, the electrical splice box further comprises a plurality of side panels. Each side panel is removably attached to a corresponding one of the plurality of sidewalls. The side panels are configured to partially cover the slots in the sidewalls and to leave an opening near the baseplate for the cable inserted into the slot.

In another example implementation of the electrical splice box, the plurality of side panels comprise a knockout plate to cover the opening near the baseplate. The knockout plate is removed from the side panel to form the opening near the baseplate when the cable is inserted into the slot.

In another example implementation, the electrical splice box further comprises a removable cover for covering the open side opposite the baseplate.

In another example implementation of the electrical splice box, the sidewalls and the baseplate are made of a material selected from the group consisting of steel, galvanized steel, and plastic.

In another example implementation of the electrical splice box, the side panels are removably attached to the corresponding sidewalls by at least one screw.

In another example implementation of the electrical splice box, the removable cover is attached to the enclosure by at least one screw.

In another aspect of the invention, a method is provided for enclosing an electrical splice. In an example of the method, a first cable with wires spliced to wires of a second cable is inserted into a first slot formed on one of a plurality of sidewalls of an electrical splice box. The sidewalls extend substantially perpendicularly from a baseplate of the electrical splice box. The first cable in the electrical splice box is secured using a first cable lock mounted in the baseplate at the first slot. The second cable is inserted into a second slot formed on another one of the plurality of sidewalls such that the wires of the first cable spliced to the wires of the second cable are disposed within the electrical splice box. The second cable is secured in the electrical splice box using a second cable lock mounted in the baseplate at the second slot.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof.

As used in this specification, the term "splice" shall mean an electrical connection between two wires. The two wires may simply be twisted together, or may be twisted together and soldered. The connected wires may then be covered by a wire connector or wiring nut.

As used in this specification, the term "cable" shall mean any group of wires that may or may not be covered by a sheath or conduit and that may be used to distribute electrical power in a building. The wires may be individually insulated except for a bare portion extending into a splice.

Figure 1:
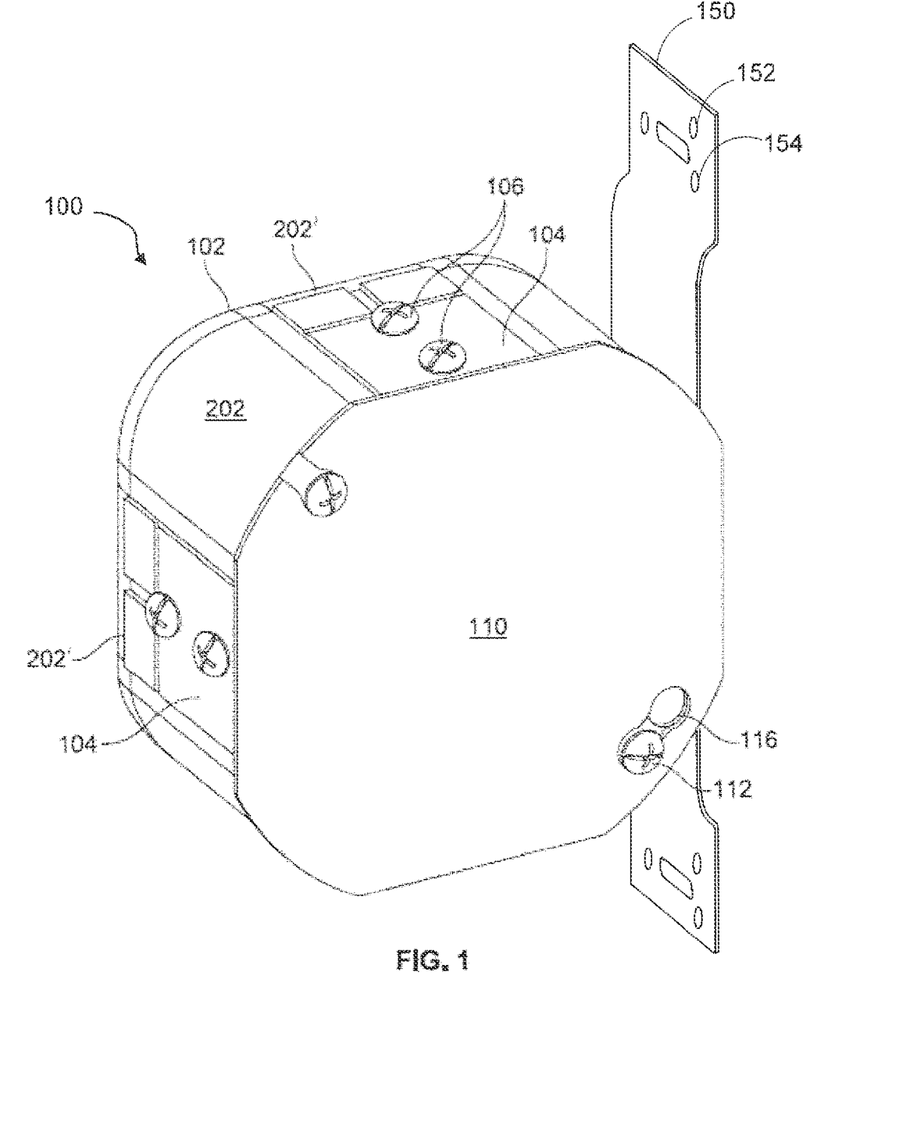
FIG. 1 is a perspective view of an example of an electrical splice box.
Figure 2:
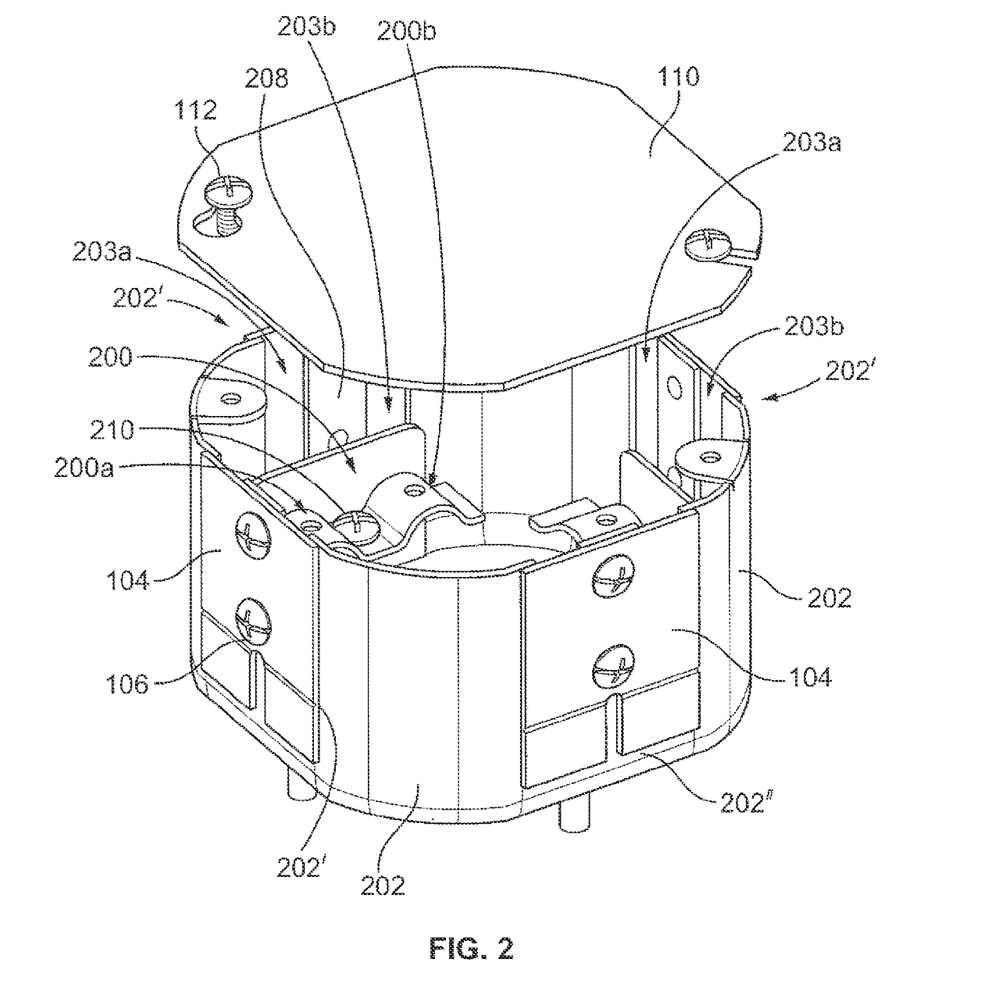
FIG. 2 is a perspective view of the example of the electrical splice box shown in FIG. 1 with the cover removed.
Figure 3A:
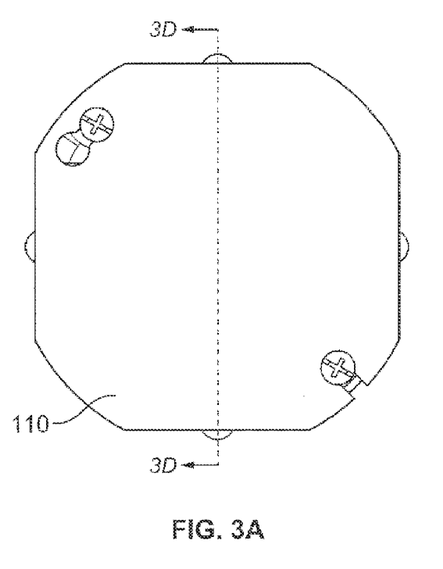
FIG. 3A is a front view of the example of the electrical splice box of FIG. 1.
Figure 3B:
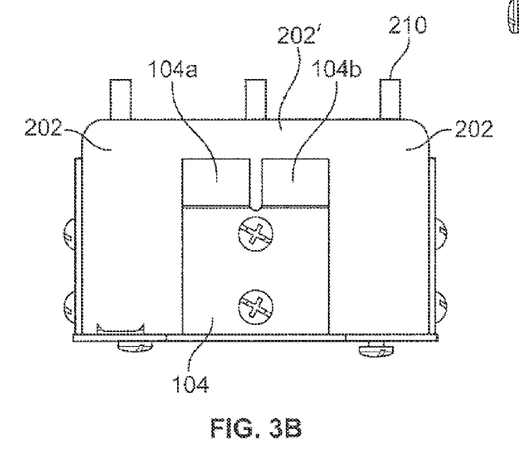
FIG. 3B is a top view of the example of the electrical splice box of FIG. 1.
Figure 3C:
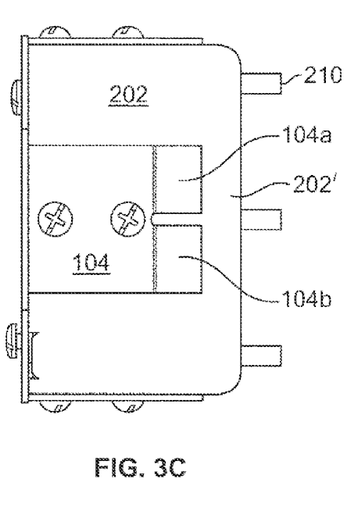
FIG. 3C is a side view of the example of the electrical splice box of FIG. 1.
Figure 3D:
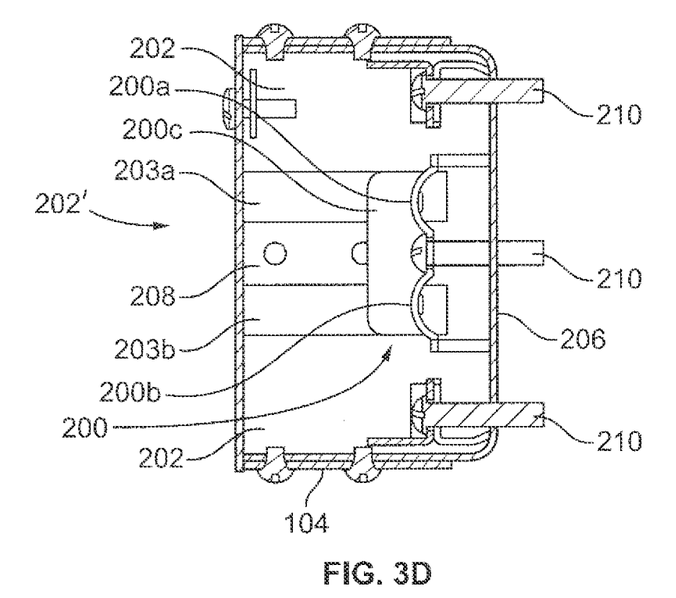
FIG. 3D is a cross-sectional view of the example of the electrical splice box of FIG. 1 at section A-A.

FIG. 1 is a perspective view of an example of an electrical splice box 100, which comprises an enclosure 102 formed by a plurality of sidewalls 202, a plurality of side panels 104 covering at least some of the sidewalls 202, and a removable cover 110. The electrical splice box 100 safely holds a splice or splices of wires extending from at least two cables, which may be safely enclosed as described below with reference to FIGS. 4A-4E. FIG. 2 is a perspective view of the electrical splice box 100 shown with the cover 110 removed. FIG. 3A is a front view of the electrical splice box 100. FIG. 3B is a top view of the electrical splice box 100. FIG. 3C is a side view of the electrical splice box 100. FIG. 3D is a cross-sectional view of the electrical splice box 100.

Referring to FIGS. 1-3D, the enclosure 102 is formed by eight sidewalls 202 extending substantially perpendicularly from the baseplate 206 to form an open side opposite the baseplate 206. The open side may be covered by the removable cover 110. The removable cover 110 may be attached using a suitable cover fastening mechanism 112. In the example illustrated, the cover fastening mechanism 112 used is a pair of screws on opposite corners of the cover 110, however any suitable fastening mechanism may be used.

The sidewalls 202 include four slotted sidewalls 202' and four unslotted sidewalls 202. Each of the four slotted sidewalls 202' include a first slot 203a and a second slot 203b separated by a interslot member 208. In other implementations, the slotted sidewalls 202' may include any number of slots. The first and second slots 203a, 203b extend from an open end at the open side of the enclosure 102 to either the baseplate 206 or to a position close to the baseplate 206. The first and second slots 203a, 203b have a width sufficient to permit insertion of one or more cables with multiple wires.

Each slotted sidewall 202' is covered by one of the plurality of side panels 104 removably attached by a fastening mechanism 106. The side panels 104 in FIGS. 1-3D are each removably attached using a pair of screws although any other suitable fastening mechanism may be used as well. The slotted sidewalls 202' include holes on the interslot member 208 to permit attachment of the side panels 104 using the pair of screws.

Each side panel 104 includes a first and second knockout panel 104a, 104b to cover a portion of each slot in an area close to the baseplate 206. The knockout panels 104a, 104b are separated from the rest of the panel by a score that enables removal of the knockout panels 104a, 104b from the rest of the side panel 104. By removing the knockout panels 104a, 104b, the side panel 104 may be attached to the slotted sidewall 202' to cover the majority of space left open by the slots 203a, 203b while leaving open space for the cable to extend out of the enclosure 102 when the electrical splice is enclosed in the electrical splice box 100. If a cable is not inserted into a particular slot 203a, 203b, the corresponding knockout panel 104a, 104b may be left attached to the side panel 104 to cover the entire slot 203a, 203b.

It is noted that the side panels 104 need not be attached to the slotted sidewalls using screws. Any other suitable attaching mechanism may be used. For example, a tongue and groove fitting may be implemented by formation on the side panel and sidewall to permit slipping the side panel on to the sidewall. The side panel may be implemented as a hinged door with a snap fit to close the side panel over the slots. The side panel may also be attached with threads or bendable tongues. Slots and insertion tabs may also be used as attachment mechanisms.

The electrical splice box 100 includes a plurality of cable locks 200 removably attached to the baseplate 206. The cable locks 200 are positioned at corresponding slots to receive and to hold cables inserted into the slots. As shown in FIG. 2, the cable lock 200 includes two cable clamps 200a and 200b with a hole between the cable clamps 200a, 200b. The hole is provided for a screw 210 to fasten the cable lock 200 to the baseplate 206. As shown in FIG. 3D, the cable locks 200 may also include a faceplate 200c to mount against the slots 203a, 203b. When the cable lock 200 is fastened to the baseplate 206, each cable clamp 200a, 200b is positioned at a corresponding one of the slots 203a, 203b on the sidewall 202. A cable with wires connected to splices may be inserted into either or both of the slots 203a, 203b and clamped to the baseplate 206 using the cable clamp 200a, 200b corresponding to the slot 203a, 203b through which the cable is inserted. The screw 210 may be used to tighten the hold on the cable or cables held by the cable clamps 200a, 200b.

It is noted that while the cable locks 200 are implemented using a pair of cable clamps that hold cables to the baseplate and a screw is used to tighten the hold of the cable clamps to the baseplate, the cable locks may be implemented using any other suitable locking mechanism. For example, the cable locks 200 may be implemented using single cable clamp mechanisms, one or more flexible clamps fixedly attached to the baseplate, ratcheting hoops, cable ties, or other compression fittings.

Referring to FIG. 1, the electrical splice box 100 may include a bracket 150 fixedly attached to one of the sidewalls 202. The bracket 150 may include through-holes 152, slots 154 or other fastening structure to permit attachment of the bracket 150 and electrical splice box 100 assembly to a building structure element, such as a stud. The bracket 150 may be attached to a stud or similar building structure element using a screw inserted in the through-hole 152 or slot 154. The bracket 150 may be may be made of a suitable solid material such as a metal including steel or galvanized steel, or a plastic material. The bracket 150 may be attached to the electrical splice box 100 using rivets, screws or other similar fasteners.

As shown in FIGS. 1-3D, the electrical splice box 100 includes an enclosure 102 formed by the sidewalls 202, the slotted sidewalls 202', and the baseplate 206. The sidewalls 202 and the slotted sidewalls 202' extend substantially perpendicularly from the baseplate 206 to form an open side opposite the baseplate 206. The sidewalls 202, slotted sidewalls 202' and baseplate 206 may be made of a suitable solid material such as a metal including steel or galvanized steel, or a plastic material. The sidewalls 202 and slotted sidewalls 202' may be formed as one section that is bent to form walls and then attached to the baseplate 206 using screws or other suitable forms of attachment. The sidewalls 202, slotted sidewalls 202', and baseplate 206 may be also be formed by machining a plate of metal. The enclosure may be closed to fully contain electrical splices by attaching the cover 110 to the open side opposite the baseplate.

It is noted that the enclosure 102 in FIGS. 1-3D is octagonal in that it has eight sidewalls: four slotted sidewalls 202' and four unslotted sidewalls 202. In other implementations, the enclosure may have any other suitable shape and have any combination of slotted and unslotted sidewalls. For example, the enclosure may be rectangular and have anywhere from one to four slotted sidewalls. The enclosure may also be any shape and have sidewalls that are all slotted.

Figure 4A:
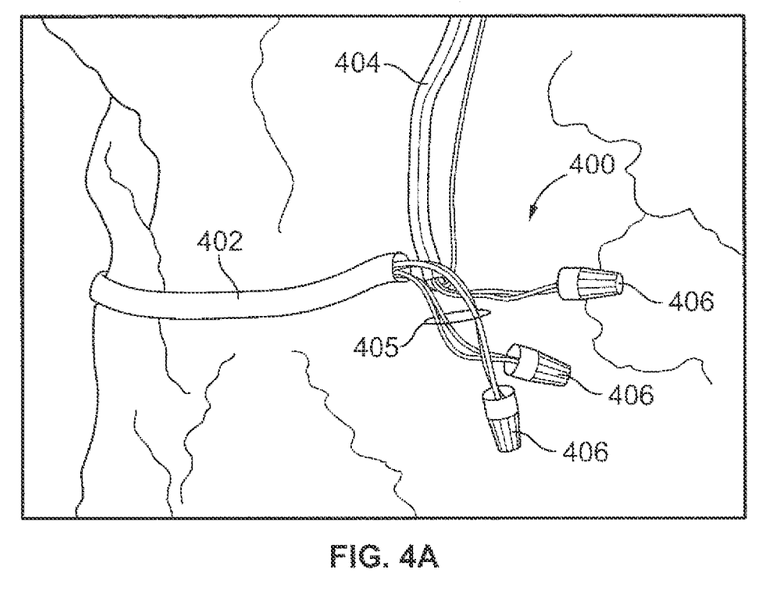
FIG. 4A shows an example of an electrical splice.

FIG. 4A shows an example of an electrical splice 400 between a first cable 402 and a second cable 404. The first and second cables 402, 404 each have wires 405 that are spliced together at wiring connectors 406. The splice 400 is typically found in buildings in the open surrounded by building insulation material and building support members. Splices such as the splice 400 in FIG. 4A is dangerous as a fire hazard.

Figure 4B:
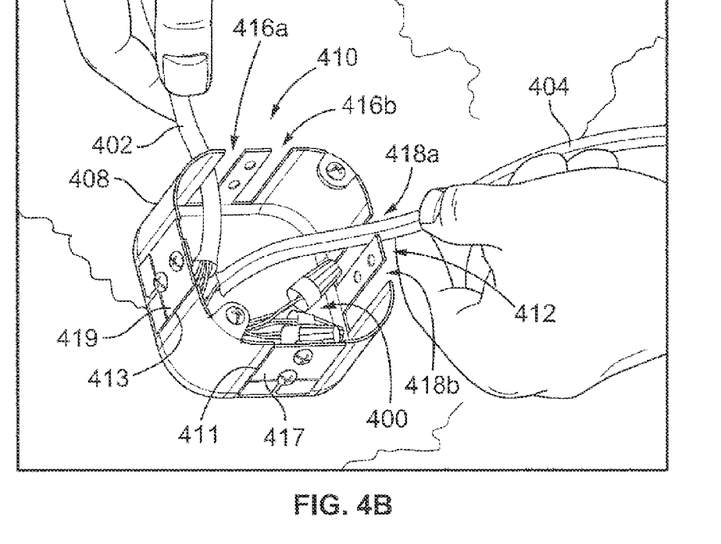
FIG. 4B shows the electrical splice of FIG. 4A disposed in the enclosure.

FIG. 4B shows the electrical splice 400 disposed in an enclosure 408 of an example of an electrical splice box. The enclosure 408 includes a first sidewall 410, a second sidewall 412, a third sidewall 411, a fourth sidewall 413, and a baseplate 426. The first and second sidewalls 410, 412 have their side panels removed. The third sidewall 411 has a side panel 417 mounted on it. The fourth sidewall 413 has a side panel 419 mounted on it. The first cable 402 has been inserted into a first slot 416a of the first sidewall 410. The second cable 404 has been inserted into a first slot 418a of the second sidewall 412. The first and second cables 402, 404 are inserted into their corresponding slots such that the splice 400 is disposed in the enclosure 408.

Figure 4C:
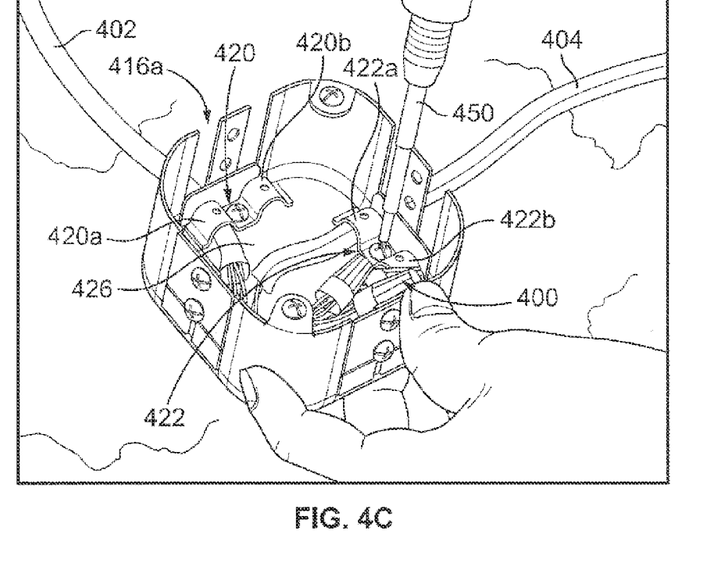
FIG. 4C illustrates a cable being fastened to the electrical splice box using a cable clamp.

FIG. 4C illustrates the use of a first cable lock 420 and a second cable lock 422 to fasten the first and second cables 402, 404 to the baseplate 426 of the electrical splice box. The first cable 402 is secured to the baseplate 426 with a first cable clamp 420a on the first cable clamp 420. A second cable clamp 420b is unused as no cable is inserted into its corresponding slot 416a. FIG. 4C shows the second cable 404 being fastened to the baseplate 426 with a first cable clamp 422a of the second cable lock 422 using a screwdriver 450. A second cable clamp 422b is unused as no cable is inserted into its corresponding slot 418b.

Figure 4D:
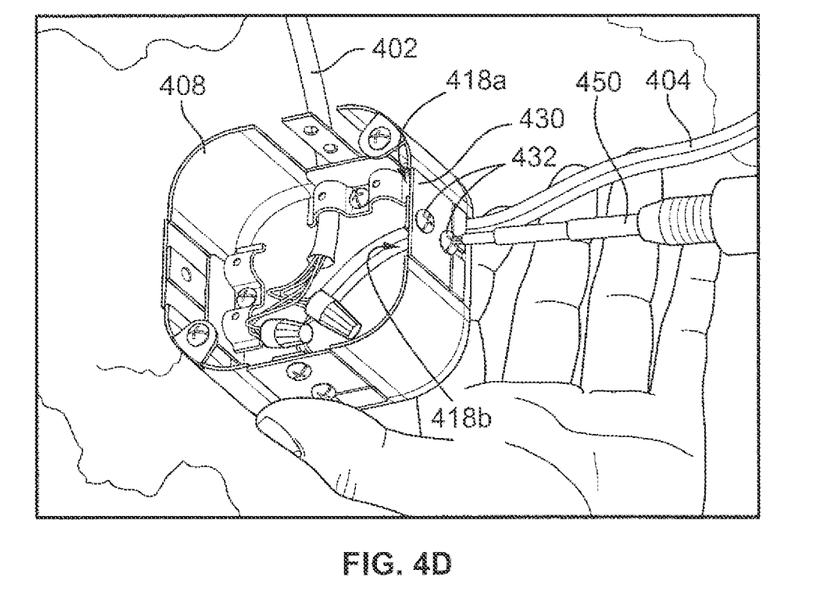
FIG. 4D illustrates attachment of a side panel to the sidewall of the electrical splice box.

FIG. 4D illustrates attachment of a side panel 430 to the second sidewall 412 of the enclosure 408. The side panel 430 is attached using a screwdriver 450 to fasten two screws 432. The side panel 430 is sized as shown in FIG. 4D to cover the two slots 418a, 418b of the second sidewall 412 and to leave space for the second cable 404 inserted into the first slot 418a. A similar side panel may be attached to the first sidewall 410.

Figure 4E:
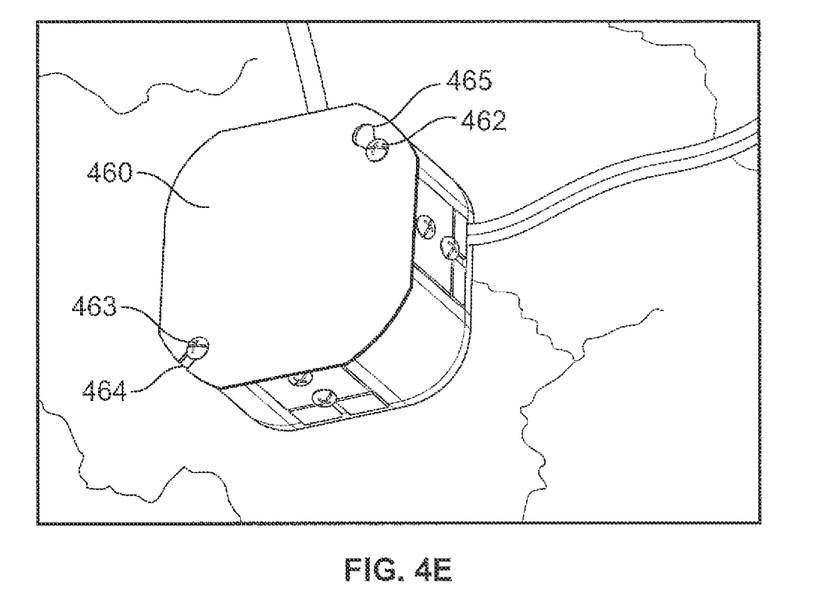
FIG. 4E shows the electrical splice box with a cover on the side opposite the baseplate.

FIG. 4E shows the electrical splice box with a cover 460 on the side opposite the baseplate 426 (shown in FIG. 4C). The cover 460 is shown fastened using a first screw 462 and a second screw 463. The cover 460 includes a closed slot 465 through which the first screw 462 may be fastened to a screw hole (not shown) formed on the enclosure 408. The closed slot 465 has a first end that is larger than the screw head and a second end that is smaller than the screw head.

The first end of the closed slot 465 permits removal of the cover 460 without having to completely remove the screw head. The second end allows for the cover 460 to be fastened to the enclosure 408 upon the tightening of the screw 462. The cover 460 also includes an open slot 464 that is smaller than the screw head of the second screw 463. The open slot 464 permits removal of the cover 460 without having to completely unscrew the second screw 463.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. An electrical splice box comprising:
  a plurality of sidewalls surrounding a baseplate, the sidewalls extending substantially perpendicularly from the baseplate to form an enclosure with an open side opposite the baseplate configured to enclose at least one splice formed with wires from at least two cables;
  a plurality of slots in at least some of the sidewalls, where at least some of the sidewalls have at least one slot;
  a plurality of cable locks each positioned at a corresponding slot to receive and to hold a cable inserted into the slot; and
  a plurality of side panels, each side panel removably attached to a corresponding one of the plurality of sidewalls, the side panels configured to at least partially cover the slots in the corresponding one of the plurality of side walls to which it is removably attached and capable of allowing for an opening proximate the baseplate sufficient to accommodate a cable there through.

2. The electrical splice box of claim 1 where the plurality of side panels comprise a knockout plate formed to cover the opening near the baseplate, where the knockout plate is removed from the side panel to form the opening near the baseplate when the cable is inserted into the slot.

3. The electrical splice box of claim 1 further comprising:
  a removable cover for covering the open side opposite the baseplate.

4. The electrical splice box of claim 3 where the removable cover is attached to the enclosure by at least one screw.

5. The electrical splice box of claim 1 where the sidewalls and the baseplate are made of a material selected from the group consisting of steel, galvanized steel, and plastic.

6. The electrical splice box of claim 1 where the side panels are removably attached to the corresponding sidewalls by at least one screw.

7. The electrical splice box of claim 1 further comprising:
  a bracket fixedly attached to one of the plurality of sidewalls, the bracket comprising fastening structure for attachment of the bracket to a building structure element.

8. The electrical splice box of claim 7 where the fastening structure includes a through-hole to permit fastening the bracket using a screw.

9. A method for enclosing an electrical splice comprising:
  removing a first side panel from one of a plurality of sidewalls of an electrical splice box, the sidewalls extending substantially perpendicularly from a baseplate of the electrical splice box, to expose a first slot formed on one of plurality of sidewall;

inserting a first cable with wires spliced to wires of a second cable into the first slot;

securing the first cable in the electrical splice box using a first cable lock mounted in the baseplate at the first slot;

removing a second side panel from another one of the plurality of sidewalls to expose a second slot formed on the another one of the plurality of sidewalls;

inserting the second cable into the second slot such that the wires of the first cable spliced to the wires of the second cable are disposed within the electrical splice box; and securing the second cable in the electrical splice box using a second cable lock mounted in the baseplate at the second slot.

10. The method of claim 9 further comprising:
covering an open end of the electrical splice box with a cover.

11. The method of claim 9 further comprising:
removing a first knockout plate from the first side panel to leave an opening for the first cable; and
removing a second knockout plate from the second side panel to leave an opening for the second cable.

12. An electrical splice box comprising:
a plurality of sidewalls surrounding a baseplate, the sidewalls extending substantially perpendicularly from the baseplate to form an enclosure with an open side opposite the baseplate configured to enclose at least one splice formed with wires from at least two cables;
two slots formed in each of at least two of the plurality of sidewalls;
a plurality of cable locks each having two cable clamps removably fastened to the baseplate, each cable lock positioned at each sidewall having the slots such that the two cable clamps are positioned at the two slots to receive and to hold a cable inserted into the corresponding slot; and
a plurality of side panels, each side panel removably attached to a corresponding one of the plurality of sidewalls having slots, the side panels configured to partially cover the two slots in the sidewalls and to leave an opening near the baseplate for the cable inserted into the slot.

13. The electrical splice box of claim 12 where each of the plurality of side panels comprises two knockout plates formed to cover the openings near the baseplate, where the knockout plates are removable from the side panel to form the opening near the baseplate when the cable is inserted into the slot.

14. The electrical splice box of claim 12 further comprising:
a removable cover for covering the open side opposite the baseplate.

15. The electrical splice box of claim 14 where the removable cover is attached to the enclosure by at least one screw.

16. The electrical splice box of claim 12 where the sidewalls and the baseplate are made of a material selected from the group consisting of steel, galvanized steel, and plastic.

17. The electrical splice box of claim 12 where the side panels are removably attached to the corresponding sidewalls by at least one screw.

18. The electrical splice box of claim 12 further comprising:
a bracket fixedly attached to one of the plurality of sidewalls, the bracket comprising fastening structure for attachment of the bracket to a building structure element.

19. The electrical splice box of claim 18 where the fastening structure includes a through-hole to permit fastening the bracket using a screw.

* * * * *